US009351501B2

(12) United States Patent
Couttenye et al.

(10) Patent No.: US 9,351,501 B2
(45) Date of Patent: May 31, 2016

(54) HEAT TOLERANT LIPID-BASED FILLING

(75) Inventors: Richard Couttenye, New York, NY (US); James Schulok, Garnerville, NY (US)

(73) Assignee: INTERCONTINENTAL GREAT BRANDS LLC, East Hanover, NJ (US)

( * ) Notice: Subject to any disclaimer, the term of this patent is extended or adjusted under 35 U.S.C. 154(b) by 0 days.

(21) Appl. No.: 13/993,450

(22) PCT Filed: Dec. 12, 2011

(86) PCT No.: PCT/US2011/064430
§ 371 (c)(1),
(2), (4) Date: Jun. 12, 2013

(87) PCT Pub. No.: WO2012/082626
PCT Pub. Date: Jun. 21, 2012

(65) Prior Publication Data
US 2013/0266717 A1 Oct. 10, 2013

Related U.S. Application Data

(60) Provisional application No. 61/423,476, filed on Dec. 15, 2010.

(51) Int. Cl.
*A23D 7/00* (2006.01)
*A23D 9/00* (2006.01)
*A21D 2/02* (2006.01)
*A23L 2/40* (2006.01)
*A21D 10/00* (2006.01)
*A21D 13/00* (2006.01)
(Continued)

(52) U.S. Cl.
CPC ............... *A23D 9/007* (2013.01); *A23D 9/013* (2013.01)

(58) Field of Classification Search
CPC ..... A23D 7/0053; A23D 9/007; A23D 7/011; A23D 9/103; A23D 9/013; A23D 9/05
USPC ................. 426/606, 551, 572, 549, 561, 613
See application file for complete search history.

(56) References Cited

U.S. PATENT DOCUMENTS

| 4,446,135 | A | * | 5/1984 | Fountaine | 424/687 |
| 4,482,575 | A | * | 11/1984 | Olds | 426/582 |
| 4,610,884 | A | * | 9/1986 | Lewis et al. | 426/103 |

(Continued)

FOREIGN PATENT DOCUMENTS

| WO | 2005006880 | 1/2005 |
| WO | 2006018077 | 2/2006 |

OTHER PUBLICATIONS

Tyle, P. 1990. Drug Development and Industrial Pharmacy 16(8)1339.*

(Continued)

*Primary Examiner* — Erik Kashnikow
*Assistant Examiner* — Assaf Zilbering
(74) *Attorney, Agent, or Firm* — Morgan, Lewis & Bockius LLP

(57) ABSTRACT

Methods and compositions for a lipid-based food filling including a lipid system, and particulates having a size of about 30 micrometers or less, the particulates having a lipophilic surface, wherein the filling has a water activity of less than about 0.3 and wherein substantially no fat separates from the filling when the filling is heated to temperatures of up to about 200° F.

49 Claims, 3 Drawing Sheets

(51) Int. Cl.
*A23D 9/007* (2006.01)
*A23D 9/013* (2006.01)

(56) References Cited

U.S. PATENT DOCUMENTS

| | | | | |
|---|---|---|---|---|
| 4,762,725 | A * | 8/1988 | Player et al. | 426/582 |
| 4,919,947 | A * | 4/1990 | Barry et al. | 426/94 |
| 5,230,913 | A | 7/1993 | Klemann | |
| 5,366,750 | A * | 11/1994 | Morano | 426/572 |
| 5,529,801 | A * | 6/1996 | Morano | 426/572 |
| 5,723,164 | A * | 3/1998 | Morano | 426/572 |
| 5,939,127 | A * | 8/1999 | Abboud | 426/572 |
| 6,322,829 | B1 * | 11/2001 | McGlynn et al. | 426/89 |
| 6,432,460 | B1 | 8/2002 | Zietlow et al. | |
| 6,447,824 | B2 | 9/2002 | Watanabe et al. | |
| 6,528,104 | B1 * | 3/2003 | Jindra et al. | 426/321 |
| 6,660,314 | B2 * | 12/2003 | Scott De Martinville et al. | 426/94 |
| 6,673,383 | B2 | 1/2004 | Cain et al. | |
| 6,743,458 | B2 * | 6/2004 | Trout et al. | 426/582 |
| 6,770,316 | B2 * | 8/2004 | Jindra et al. | 426/572 |
| 6,773,744 | B1 | 8/2004 | Ward et al. | |
| 6,793,956 | B2 * | 9/2004 | Trout et al. | 426/582 |
| 6,905,719 | B2 * | 6/2005 | Wang et al. | 426/94 |
| 6,951,661 | B2 | 10/2005 | Roy et al. | |
| 7,452,564 | B2 | 11/2008 | Jindra et al. | |
| 8,287,936 | B2 * | 10/2012 | Loh et al. | 426/601 |
| 8,691,316 | B2 * | 4/2014 | Loh et al. | 426/601 |
| 2002/0098267 | A1 | 7/2002 | Heisey et al. | |
| 2009/0081335 | A1 | 3/2009 | Ortiz et al. | |
| 2009/0269446 | A1 * | 10/2009 | Rabault et al. | 426/94 |
| 2010/0178388 | A1 | 7/2010 | Fu | |
| 2010/0209588 | A1 | 8/2010 | Loh et al. | |

OTHER PUBLICATIONS

The International Preliminary Report on Patentability for International Application PCT/US2011/064430, Jun. 18, 2013, 1 pages.
The International Search Report for International Application PCT/US2011/064430, dated Apr. 25, 2012, 2 pages.
The Written Opinion for International Application PCT/US2011/064430, dated Apr. 25, 2012, 4 pages.
The Australian Examination Report for Australian Application No. 2011344118, dated Feb. 13, 2014, 3 pages.
The Second Chinese Office Action for Chinese Patent Application No. 201180059956.3, dated Mar. 31, 2015, 24 pages.
The Chinese Office Action for Chinese Application No. 201180059956.3, dated Jul. 14, 2014, 61 pages.

* cited by examiner

HEAT TOLERANT LIPID-BASED FILLING

CROSS-REFERENCE TO RELATED APPLICATIONS

This application is a U.S. National Stage of International Application No. PCT/US2011/064430, filed Dec. 12, 2011, which claims the benefit of U.S. Provisional Patent Application No. 61/423,476 filed Dec. 15, 2010 all of which are incorporated by reference herein in their entirety.

BACKGROUND OF THE INVENTION

The present invention relates to heat tolerant lipid-based edible fillings.

BRIEF SUMMARY OF THE INVENTION

According to some embodiments of the present invention, an edible filling includes a lipid system and particulates having a size of about 30 micrometers or less. In some embodiments, the filling has a water activity of less than about 0.3 and substantially no fat separates from the filling when the filling is heated to temperatures of up to about 200° F.

In certain embodiments, the lipid system includes a high-melting lipid having a melting point of about 110° F. or higher, such as shortening, and a low-melting lipid having a melting point of about 105° F. or lower, such as soybean oil. In some embodiments, the lipid system includes about 60 wt % to about 90 wt % low-melting lipid and about 10 wt % to about 40 wt % high-melting lipid; or about 75 wt % low-melting lipid and about 25 wt % high-melting lipid. The lipid system may be present in an amount of about 25 wt % to about 45 wt % of the filling; or about 33 wt % of the filling.

The particulates of the filling may be present in an amount of about 10 wt % to about 25 wt % of the filling; or about 17 wt % of the filling. In some embodiments, the particulates have a lipophilic surface. In some embodiments, the particulates have a hydrophobic degree of about 5 g to about 35 g. In some embodiments, the particulates include calcium carbonate. In some embodiments, lipids of the lipid system may be absorbed on the surface of the particulates.

In some embodiments, the filling includes an emulsifier, such as lecithin. The emulsifier may be present in an amount of less than about 5 wt % of the filling.

Fillings of some embodiments of the present invention may include sweetener. Suitable sweetener particles may be sized to pass through a U.S. Sieve # 200 or smallers, such as 6× sugar or 10× sugar. In some embodiments, sweetener is present in an amount of about 40 wt % to about 60 wt % of the filler; or about 50 wt % of the filler.

In certain embodiments, the filling has an initial viscosity before heating, and a final viscosity after being subjected to a temperature of about 400° F. for about 5 to about 30 minutes. In some embodiments, the final viscosity is greater than the initial viscosity. In some embodiments, the initial viscosity is about 100,000 cps to about 200,000 cps, and the final viscosity is about 70,000 cps to about 170,000 cps.

According to some embodiments of the present invention, an edible filling is prepared by: (a) blending a lipid system with particulates having a size of about 30 micrometers or less and a lipophilic surface until the particulates are at least substantially fully dispersed within the lipid system, to form a first blended mixture; and (b) blending the first blended mixture with sweetener to form a filling having a water activity of about 0.3 or less and in which substantially no fat separates from the filling when the filling is heated to temperatures of up to about 200° F.

In some embodiments, the lipid system is blended with the particulates for no more than 7 minutes at about 60 rpm.

In some embodiments, the method further includes blending the first blended mixture with a suitable emulsifier and/or heating the filling to a temperature of up to about 200° F.

BRIEF DESCRIPTION OF THE SEVERAL VIEWS OF THE DRAWINGS

The foregoing summary, as well as the following detailed description of certain embodiments of a food product will be better understood when read in conjunction with the following exemplary embodiments, the appended drawing and the appendices.

DETAILED DESCRIPTION OF THE INVENTION

Figure 1:
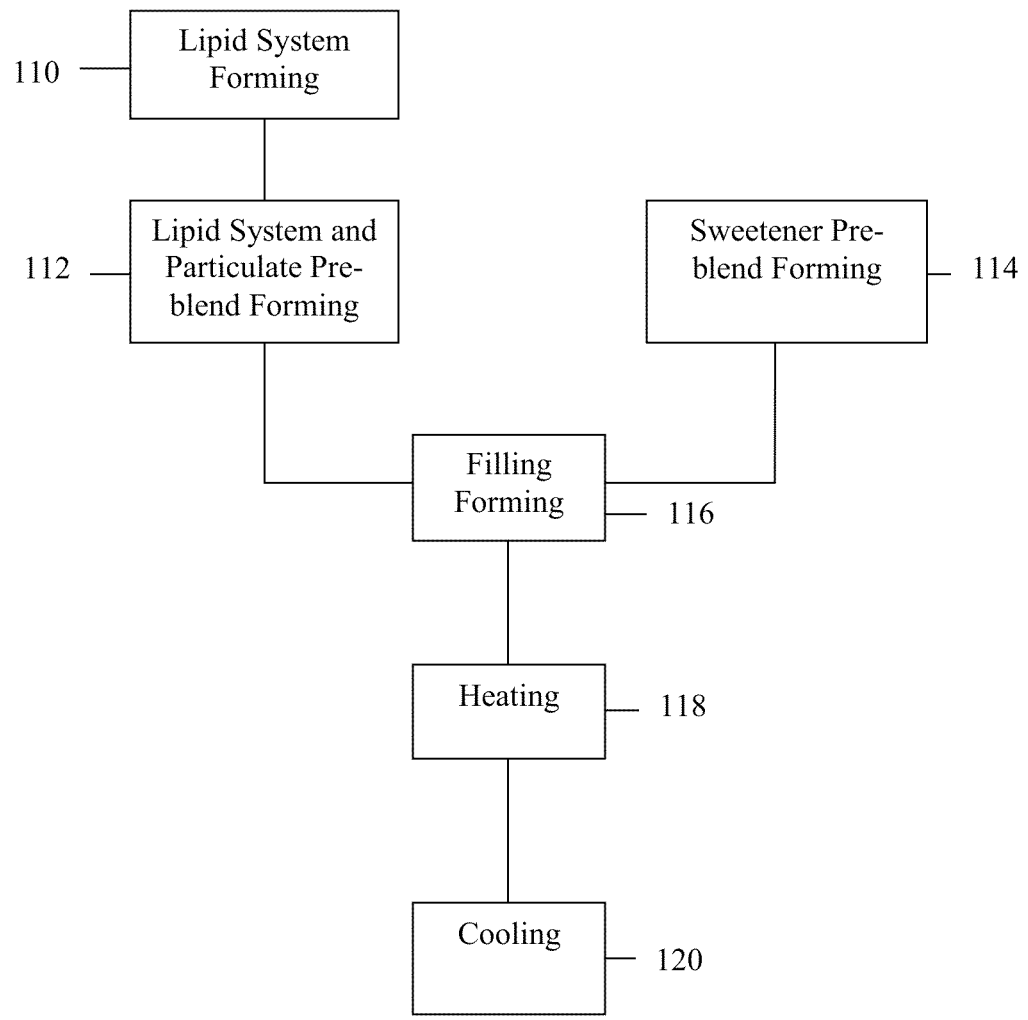
FIG. 1 is a process flow diagram of an exemplary embodiment of the present invention.

Methods and compositions of the present invention relate to heat tolerant, lipid-based edible fillings. Referring to FIG. 1 in detail, the flow chart shows a general process scheme for making a filling in accordance with an exemplary embodiment of the present invention. As illustrated, a filling may be produced by a method that includes: a) lipid system forming 110; b) lipid system and particulate pre-blend forming 112; c) sweetener pre-blend forming 114; d) filling forming 116; e) heating 118; and f) cooling 120. In some embodiments, lipid system forming 110 includes blending one or more lipids (or, for example, two or more lipids), such as desired proportions of high-melting and/or low-melting lipids, to form a blended lipid system. One or more emulsifiers, such as lecithin, may also be added while blending the one or more lipids. Next, the lipid system may be blended with particulates in step 112 to form a lipid system and particulate pre-blend. In some embodiments, the particulates have a lipophilic surface, and therefore can readily disperse within the lipids of the lipid system during mixing. In some embodiments, the lipids are absorbed on the surface of the particulates. In some embodiments, sweetener pre-blend forming 114 includes mixing sweetener and flavor until blended. Once the lipid system and particulate pre-blend and the sweetener pre-blend are formed, the pre-blends may be combined in filling forming step 116.

The filling may be combined with any suitable pre-heated or pre-baked food product, as desired. For example, in some embodiments, the filling may be coextruded with or layered onto a dough. In some embodiments, the filling has a viscosity before heating such that the filling is suitable for pumping and/or extruding, such as a viscosity of about 100,000 cps to about 200,000 cps. In some embodiments, the filling has a smooth and creamy texture after heating (e.g., baking).

In some embodiments, the filling may be heated 118, for example, as a filling layer in a food product. In some embodiments, the filling is heat tolerant to a filling temperature of up to about 200° F. In some embodiments, such a filling does not boil over during heating and does not undergo significant degradation or decomposition, e.g., separation of the fat in the filling from the other filling components. Such a heat tolerant filling may exhibit substantially no oil separation from the filling during heating (e.g., baking) but may, in some embodiments, undergo rheological changes. In some embodiments, after heating 118 and cooling 120, the filling has a viscosity that is different than the viscosity before heating. In some embodiments, the filling has a viscosity after heating and cooling that is higher than the viscosity of the filling before heating. In other embodiments, the filling has a viscosity after heating and cooling that is lower than the viscosity of the filling before heating. In some embodiments, after heating 118 and cooling 120, the filling has a soft, smooth, lubricious texture and is not gritty or crystallized.

Further details regarding the components, characteristics, uses, and methods of preparing a heat tolerant filling of the present invention are described below.

Composition

Heat tolerant fillings of the present invention may contain a lipid system, particulates, and sweetener. Components of the fillings and their amounts may be chosen to provide a filling composition with the desired properties, such as texture, viscosity and/or heat tolerance. In some embodiments, components of the fillings and their amounts are selected to provide a filling composition that is pumpable before heating and that is soft and smooth, with desirable viscosity, after heating and cooling. In other embodiments, components of the fillings and their amounts are selected to provide a filling composition that is pumpable before heating and that is soft and smooth, with a decreased viscosity, after heating and cooling. In some embodiments, a filling of the present invention has a low water activity, such as up to 0.3, about 0.3, about 0.25, about 0.2, about 0.15 or about 0.1.

Lipid system

Lipid systems of the present invention may include one or more types of lipids, including high-melting and/or low-melting lipids, such as solid and/or liquid fats. Proportions and types of lipids in the lipid system may be chosen to achieve the desired properties of the filling, such as heat tolerance, rheology, and texture.

In certain embodiments, suitable high-melting lipids have a melting point of about 110° F. or higher; about 115° f or higher; about 120° F. or higher; about 125° F. or higher; about 130° F. or higher; or about 140° F. or higher. In some embodiments, suitable high-melting lipids include edible long chain fatty acids, their monoglycerides, diglycerides, and triglycerides, their alkaline metal salts, and other derivatives thereof. Generally, the edible high-melting lipids may be formed from long chain fatty acids having at least 14 carbon atoms and preferably 18 to 26 carbon atoms. In some embodiments, the long chain fatty acids are saturated. Suitable saturated long chain fatty acids used to form the edible, high melting fats include, for example, myristic acid, palmitic acid, stearic acid, arachidic acid, behenic acid, lignoceric acid, and the like; their derivatives, including, for example, glycerol monostearate, glycerol distearate, glycerol tristerate, calcium stearate, magnesium stearate, calcium palmatate, high-melting sucrose polyesters, high-melting fatty alcohols, high-melting waxes, and the like, as well as mixtures thereof. In addition, synthesized or chemically derived oils or oil substitutes may also be applicable, such as sucrose polyester of fatty acids. Examples of suitable solid fats include shortening, such as HF T15 fat.

In some embodiments, the lipid system may include high-melting lipids in an amount of about 10 wt % to about 40 wt % of the lipid system; about 15 wt % to about 35 wt % of the lipid system; about 20 wt % to about 30 wt % of the lipid system; about 10 wt % of the lipid system; about 15 wt % of the lipid system; about 20 wt % of the lipid system; about 25 wt % of the lipid system; about 30 wt % of the lipid system; about 35 wt % of the lipid system; or about 40 wt % of the lipid system. In some embodiments, a filling composition may include high-melting lipids in an amount of about 1 wt % to about 20 wt % of the filling; about 1 wt % to about 19 wt % of the filling; about 1 wt % to about 18 wt % of the filling; about 1 wt % to about 17 wt % of the filling; about 1 wt % to about 16 wt % of the filling; about 1 wt % to about 15 wt % of the filling; about 2 wt % to about 14 wt % of the filling; about 3 wt % to about 13 wt % of the filling; about 4 wt % to about 12 wt % of the filling; about 5 wt % to about 11 wt % of the filling; about 6 wt % to about 10 wt % of the filling; about 7 wt % to about 9 wt % of the filling; about 2 wt % of the filling; about 4 wt % of the filling; about 6 wt % of the filling; about 8 wt % of the filling; about 10 wt % of the filling; about 12 wt % of the filling; about 14 wt % of the filling; about 16 wt % of the filling; about 18 wt % of the filling; or about 20 wt % of the filling.

Suitable low-melting lipids may include hydrogenated or non-hydrogenated fractionated or non-fractionated oils and mixtures thereof having a melting point of about 105° F. or lower; about 100° F. or lower; about 95° F. or lower; about 90° F. or lower; about 85° F. or lower; about 80° F. or lower; or about 75° F. or lower. Suitable low-melting lipids include natural or partially hydrogenated vegetable or animal oils including, for example, coconut oil, palm kernel oil, rapeseed oil, soybean oil, palm oil, sunflower oil, corn oil, canola oil, cottonseed oil, peanut oil, cocoa butter, anhydrous milk fat, lard, beef fat, and the like, as well as mixtures thereof including oil soluble components derived therefrom, such as phospholipids. Examples of suitable liquid fats include oils such as low trans-fat oils.

In some embodiments, the lipid system may include low-melting lipids in an amount of about 40 wt % to about 90 wt % of the lipid system; about 45 wt % to about 85 wt % of the lipid system; about 50 wt % to about 80 wt % of the lipid system; about 55 wt % to about 75 wt % of the lipid system; about 60 wt % to about 70 wt % of the lipid system; about 40 wt % of the lipid system; about 45 wt % of the lipid system; about 50 wt % of the lipid system; about 55 wt % of the lipid system; about 60 wt % of the lipid system; about 65 wt % of the lipid system; about 70 wt % of the lipid system; about 75 wt % of the lipid system; about 80 wt % of the lipid system; about 85 wt % of the lipid system; or about 90 wt % of the lipid system. In some embodiments, the filling includes low-melting lipids in an amount of about 5 wt % to about 45 wt % of the filling; about 10 wt % to about 40 wt % of the filling; about 15 wt % to about 35 wt % of the filling; about 20 wt % to about 30 wt % of the filling; about 5 wt % of the filling; about 7 wt % of the filling; about 10 wt % of the filling; about 12 wt % of the filling; about 15 wt % of the filling; about 17 wt % of the filling; about 20 wt % of the filling; about 22 wt % of the filling; about 25 wt % of the filling; about 27 wt % of the filling; about 30 wt % of the filling; about 32 wt % of the filling; about 35 wt % of the filling; about 37 wt % of the filling; about 40 wt % of the filling; about 42 wt % of the filling; or about 45 wt % of the filling.

In some embodiments, the filling includes a lipid system in an amount of about 20 wt % to about 50 wt % of the filling; about 25 wt % to about 45 wt % of the filling; about 30 wt % to about 40 wt % of the filling; about 30 wt % to about 35 wt % of the filling; about 20 wt % of the filling; about 25 wt % of the filling; about 30 wt % of the filling; about 33 wt % of the filling; about 35 wt % of the filling; about 40 wt % of the filling; or about 45 wt % of the filling.

Emulsifier

A filling of the present invention may also include an emulsifier. Any suitable emulsifier may be included, such as those having a hydrophilic-lipophilic balance value of about 4 to about 6. In some embodiments, a suitable emulsifier includes lecithin. In some embodiments, a filling includes an emulsifier in an amount of less than about 5 wt % of the filling; less than about 4.5 wt % of the filling; less than about 4 wt % of the filling; less than about 3.5 wt % of the filling; less than about 3 wt % of the filling; less than about 2.5 wt % of the filling; less than about 2 wt % of the filling; less than about 1.5 wt % of the filling; less than about 1 wt % of the filling; less than about 0.75 wt % of the filling; or less than about 0.5 wt % of the filling.

Particulates

Fillings of the present invention may include particulates. In some embodiments, suitable particulates have a lipophilic surface. In some embodiments, suitable particulates have a hydrophobic surface. The hydrophobic degree of the surface of the particulates is a value measured by the oil absorption assay method of JIS K6223. A higher hydrophobic degree may be associated with a higher oil absorption value. In some embodiments, suitable particles have a hydrophobic degree (oil absorption) of about 5 g to about 35 g; about 10 g to about 30 g; about 15 g to about 25 g; about 5 g; about 10 g; about 15 g; about 20 g; about 25 g; about 30 g; or about 35 g.

In some embodiments, smaller particulates are desirable, for instance, because they provide more surface area. In some embodiments, a particulate has a size of about 1 micrometer to about 50 micrometers; about 1 micrometer to about 45 micrometers; about 1 micrometer to about 40 micrometers; about 1 micrometer to about 35 micrometers; about 1 micrometer to about 30 micrometers; about 1 micrometer to about 25 micrometers; about 1 micrometer to about 20 micrometers; about 1 micrometer; about 5 micrometers; about 10 micrometers; about 15 micrometers; about 20 micrometers; about 25 micrometers; about 30 micrometers; about 35 micrometers; about 40 micrometers; about 45 micrometers; about 50 micrometers; about 10 micrometers or less; about 15 micrometers or less; about 20 micrometers or less; about 25 micrometers or less; about 30 micrometers or less; about 35 micrometers or less; about 40 micrometers or less; about 45 micrometers or less; or about 50 micrometers or less. In some embodiments, particulates are sized to pass through a U.S. Sieve #200; U.S. Sieve #270; or U.S. Sieve #325.

In some embodiments, suitable particulates include calcium carbonate, magnesium carbonate, magnesium hydroxide, magnesium trisilicate, aluminum silicate, monocalcium phosphate, dicalcium phosphate, tricalcium phosphate, titanium dioxide, aluminum oxide, alumina trihydrate, and mixtures of any of these.

In some embodiments, a filling includes particulates in an amount of about 5 wt % to about 25 wt % of the filling; about 7 wt % to about 23 wt % of the filling; about 10 wt % to about 21 wt % of the filling; about 12 wt % to about 20 wt % of the filling; about 15 wt % to about 18 wt % of the filling; about 5 wt % of the filling; about 7 wt % of the filling; about 10 wt % of the filling; about 12 wt % of the filling; about 14 wt % of the filling; about 16 wt % of the filling; about 18 wt % of the filling; about 20 wt % of the filling; about 22 wt % of the filling; about 24 wt % of the filling; or about 25 wt % of the filling. In some embodiments, a filling includes particulates in an amount of about ¼ the weight percent of the lipid system in the filling; in an amount of about ⅓ the weight percent of the lipid system in the filling; in an amount of about ½ the weight percent of the lipid system in the filling; in an amount of about ⅔ the weight percent of the lipid system in the filling; or in an amount of about ¾ of the weight percent of the lipid system in the filling.

1. Sweetener and Flavor

Fillings of the present invention may include sweeteners and/or flavors. In some embodiments, sweeteners and flavors with particles sized to pass through U.S. Sieve #200 or smaller are suitable. In some embodiments, sweeteners and flavors should be of a size and/or composition that is suitable to avoid a gritty texture in the filling. In some embodiments, sweeteners may include 6× sugar, 10× sugar, or non-nutritive or artificial sweeteners.

In some embodiments, a filling includes a sweetener in an amount of about 25 wt % to about 75 wt % of the filling; about 30 wt % to about 70 wt % of the filling; about 35 wt % to about 65 wt % of the filling; about 40 wt % to about 60 wt % of the filling; about 45 wt % to about 55 wt % of the filling; about 25 wt % of the filling; about 30 wt % of the filling; about 35 wt % of the filling; about 40 wt % of the filling; about 45 wt % of the filling; about 50 wt % of the filling; about 55 wt % of the filling; about 60 wt % of the filling; about 65 wt % of the filling; about 70 wt % of the filling; or about 75 wt % of the filling.

Fillings of the present invention may include any suitable flavors. In some embodiments, suitable flavors include any natural or artificial liquid or solid flavors, such as vanillin crystals and/or cocoa powder. In some embodiments, a filling includes flavor in an amount of about 0.1 wt % to about 20 wt % of the filling; about 0.1 wt % to about 18 wt % of the filling; about 0.1 wt % to about 16 wt % of the filling; about 0.1 wt % to about 14 wt % of the filling; about 0.1 wt % to about 12 wt % of the filling; about 0.1 wt % to about 10 wt % of the filling; about 0.1 wt % to about 8 wt % of the filling; about 0.1 wt % to about 6 wt % of the filling; about 0.1 wt % to about 4 wt % of the filling; about 0.1 wt % to about 2 wt % of the filling; about 0.1 wt % to about 1 wt % of the filling; about 0.1 wt % of the filling; about 0.2 wt % of the filling; about 0.3 wt % of the filling; about 0.4 wt % of the filling; about 0.5 wt % of the filling; about 0.6 wt % of the filling; about 0.7 wt % of the filling; about 0.8 wt % of the filling; about 0.9 wt % of the filling; about 1 wt % of the filling; about 2 wt % of the filling; about 4 wt % of the filling; about 6 wt % of the filling; about 8 wt % of the filling; about 10 wt % of the filling; about 12 wt % of the filling; about 14 wt % of the filling; about 16 wt % of the filling; about 18 wt % of the filling; or about 20 wt % of the filling.

Method of Making

In some embodiments, the filling is generally prepared by mixing the lipid system, particulates, emulsifier and flavors and/or sweeteners as described above to create a blended mixture. In some embodiments, a lipid system is prepared by mixing the lipid components, such as high-melting and low-melting lipids, until blended. In some embodiments, an emulsifier is added while blending the lipids. The lipids may be mixed, for example, for about 2 minutes at about 15 rpm to about 25 rpm.

In some embodiments, a lipid system and particulate pre-blend is prepared by mixing the blended lipid system with particulates and mixing them until blended. In some embodiments, the lipid system and particulates are mixed long enough that the particulates fully or substantially fully disperse in the lipid system. In some embodiments, stability of the dispersion of the particulates in the lipid system is facilitated by the lipophilic character of the particulate surface and the size of the particulates. In some embodiments, the lipids are absorbed on the surface of the particulates. In some embodiments, the particulates fully disperse or substantially fully disperse in the lipids after mixing for less than about 10 minutes at about 60 rpm; less than about 9 minutes at about 60 rpm; less than about 8 minutes at about 60 rpm; or less than about 7 minutes at about 60 rpm.

A sweetener pre-blend may be prepared by mixing a flavor with a small amount of sweetener, such as about 10 wt % or less of the total amount of sweetener in the filling. In some embodiments, the sweetener pre-blend may be mixed by hand.

In some embodiments, the sweetener pre-blend and the lipid system and particulate pre-blend may be mixed until blended, to prepare a filling. In some embodiments, the pre-blends are mixed, for example, for about 6 minutes at about 55 rpm to about 65 rpm.

Use and Properties

The combination of components and methods of making fillings of the present invention provide a unique lipid-based filling which may be suitable for incorporation as a filling in food products prior to heating. In some embodiments, lipid-based fillings of the present invention have a low water activity yet are heat tolerant at temperatures of up to a filling temperature of about 300° F.; about 275° F.; about 250° F.; about 225° F.; about 200° F.; or about 175° F. Additionally, fillings of the present invention may demonstrate rheology characteristics such that the filling is pumpable prior to heating, does not boil over during heating, and results in a lubricious mouthfeel after cooling. Such properties may allow fillings of the present invention to be combined with a pre-heated or pre-baked food product, such as a dough, without the filling having a detrimental effect on visual appeal or organoleptic qualities of the filling. For example, in one embodiment, a filling can be combined with a dough matrix (e.g., forming a discrete filling layer) and baked at a temperature of about 400° F. for 5 minutes to about 30 minutes, with no substantial separation of the fat from the other ingredients of the filling and/or no substantial migration of fat from the filling to the dough, and without the filling boiling over from the dough.

Figure 2:
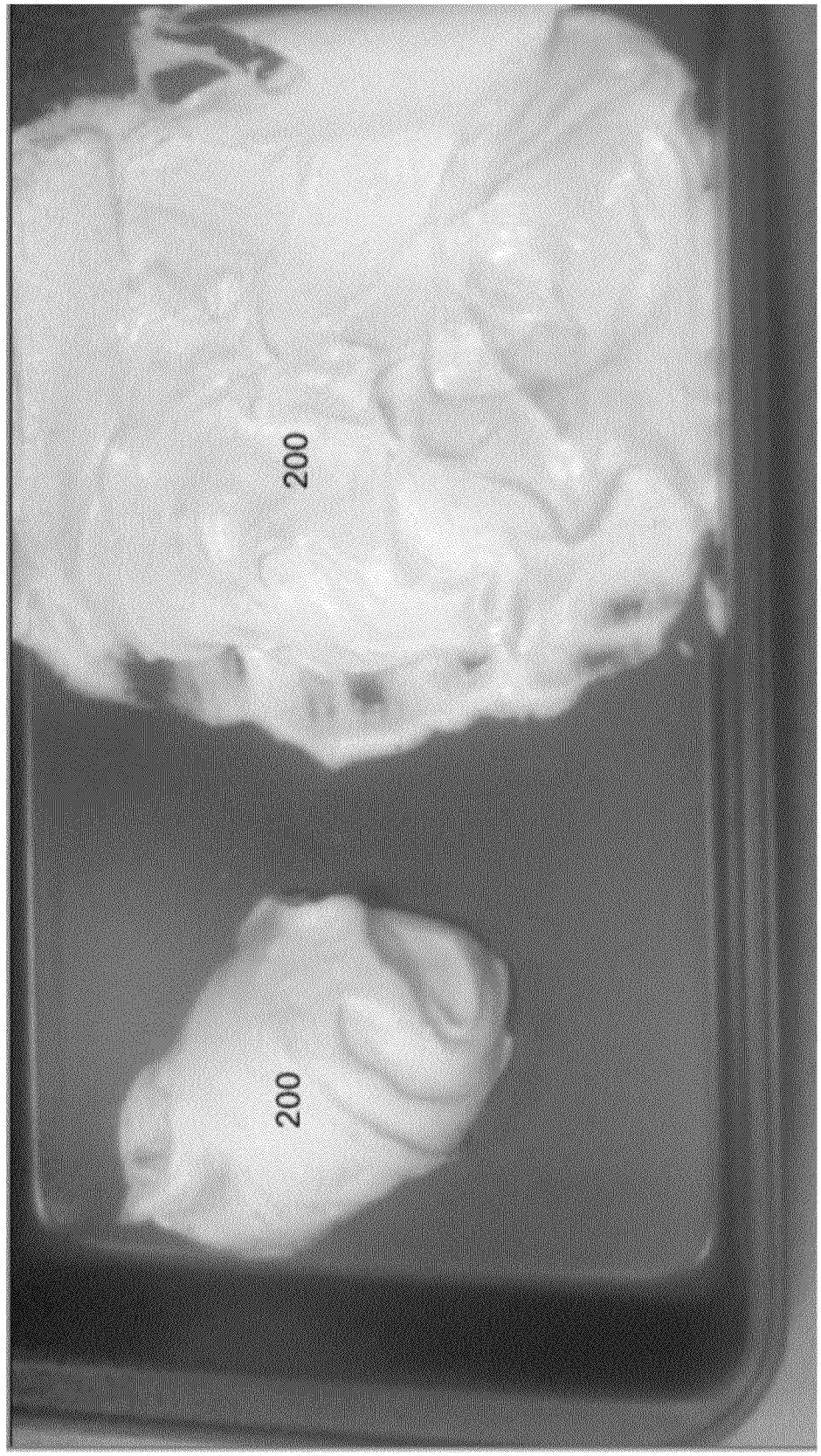
FIG. 2 depicts a filling of some embodiments of the present invention before heating.
Figure 3:
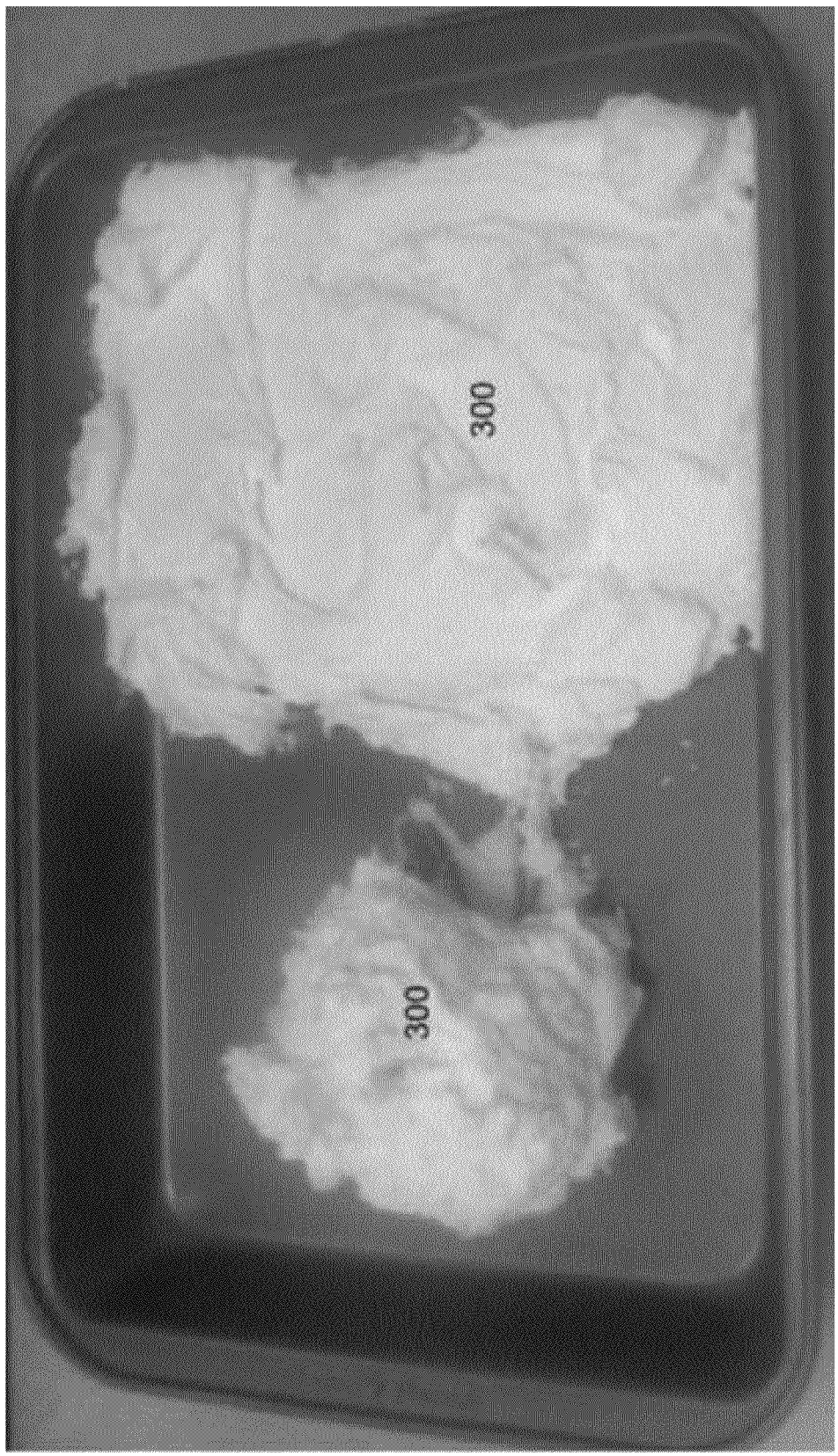
FIG. 3 depicts a filling 300 before heating.

It is believed that the presence of particulates dispersed in the lipid system may provide the unique and desirable characteristics of fillings in some embodiments of the present invention, such as the heat tolerance, rheology control, and texture. For example, fillings which are not heat tolerant may degrade or decompose during heating, resulting in a separation of the fat in the filling from the other filling components, and/or substantial migration of the oil from the filling to, for example, an adjacent casing, dough component or the like. By combining the lipids of the present invention with particulates and allowing lipids to absorb on the particulates, it is believed that the fillings are able to maintain the mixture of fat within the filling with no or substantially no separation of the fat or substantial migration of the fat from the filling at temperatures up to about 200° F. While the fillings of the present invention are heat tolerant, the rheology of the filling may change after heating. Before heating, the filling may have viscosity that is suitable for the filling to be pumped or extruded. As shown in FIG. 2, a filling 200 prepared according to formulations and methods of the present invention is smooth and creamy before heating, and may have a suitable viscosity to be pumped or extruded. FIG. 3 illustrates filling 300, which does not include particulates. Filling 300 does not include calcium carbonate particulates.

In some embodiments, a filling of the present invention has a viscosity before heating of about 100,000 cps to about 200,000 cps; about 110,000 cps to about 170,000 cps; about 100,000 cps; about 110,000 cps; about 120,000 cps; about 130,000 cps; about 140,000 cps; about 150,000 cps; about 160,000 cps; about 170,000 cps; about 180,000 cps; about 190,000 cps; or about 200,000 cps.

In some embodiments, during heating, the filling maintains a high enough viscosity that the filling does not boil over or flow undesirably, for instance away from a dough in which the filling is incorporated.

After the filling is heated and then cooled, the filling may have a viscosity which is different than, for instance higher than or in some embodiments lower than, the viscosity of the filling before heating. In some embodiments, the viscosity is suitable to provide a creamy and lubricious mouthfeel to the filling. In some embodiments, the filling has a viscosity after heating and cooling of about 50,000 cps to about 200,000 cps; about 70,000 cps to about 170,000 cps; about 50,000 cps; about 60,000 cps; about 70,000 cps; about 80,000 cps; about 90,000 cps; about 100,000 cps; about 110,000 cps; about 120,000 cps; about 130,000 cps; about 140,000 cps; about 150,000 cps; about 160,000 cps; about 170,000 cps; about 180,000 cps; about 190,000 cps; or about 200,000 cps.

Many standard fillings in the art are known to become gritty after heating. The grittiness may be a result of fat and/or sugar in the filling melting during heating, and then recrystallizing after cooling. It is believed that in some embodiments of the present invention, the interaction between the lipids and particulates, such as the absorption of the lipids on the surface of the particulates in the filling, prevents grittiness and hardening of the filling by disrupting crystal growth during or after heating. In some embodiments, the particulates may disrupt crystal growth during or after heating by forming a buffer to prevent crystallization. As a result, fillings of the present invention may have a soft, creamy texture after heating.

The following examples, wherein all parts, percentages, and ratios are by weight, and all temperatures are in ° F. unless indicated to the contrary, illustrate some embodiments of the present invention:

EXAMPLES

Example 1

A filling was prepared according to the following formulation:

| Formulation 1 | | | |
|---|---|---|---|
| Ingredients | Pounds | Ounces | Wt % of Filling |
| Group 1 | | | |
| HF T15 fat - shortening | 50 | 0 | 8.32 |
| LT2 - low trans-fat oil | 150 | 0 | 24.97 |
| Calcium carbonate | 100 | 0 | 16.65 |
| Lecithin | 0 | 5.0 | 0.05 |
| Group 2 | | | |
| 6X sugar | 295 | 0 | 49.12 |
| Vanillin crystals | 0 | 5 | 0.05 |
| 6X sugar (to mix with vanillin) | 5 | 0 | 0.83 |

Group 1 was prepared by first mixing the fat, oil, and lecithin for 2 minutes at 20 rpm. The calcium carbonate was added and mixed for 6 minutes at 60 rpm. The vanillin was then pre-blended by hand with the small amount of sugar. The vanillin mixture and the remaining sugar were then added to a mixture with the Group 1 mixture, and mixed for 6 minutes at 60 rpm.

Example 2

A filling of Formulation 1, above, and Formulation 2, below, were each prepared. Formulation 2 did not contain particulates, such as the calcium carbonate of Formulation 1, and was tested as a control to be compared against Formulation 1.

| Formulation 2 | | | |
|---|---|---|---|
| Ingredients | Pounds | Ounces | Wt % of Filling |
| Group 1 | | | |
| HF T15 fat - shortening | 200 | 0 | 33.33 |
| LT2 - low trans-fat oil | 0 | 0 | 0 |
| Calcium carbonate | 0 | 0 | 0 |
| Lecithin | 0 | 5.0 | 0.05 |
| Group 2 | | | |
| 6X sugar | 394 | 7.04 | 65.74 |
| Vanillin crystals | 0 | 5 | 0.05 |
| 6X sugar (to mix with vanillin) | 5 | 0 | 0.83 |

The viscosity of Formulations 1 and 2 was measured using a Brookfield Model DV-II Viscometer, Spindle #6, in 300 g batch size. The viscosities were measured at the temperatures and rpm's listed below before heating, and after baking at 350° F. for 10 minutes.

| | RPM | Temp (° C.) | Viscosity (cps) |
|---|---|---|---|
| Pre-bake Viscosities | | | |
| Formulation 1 | 1 | 26.1 | 166,000-168,000 |
| | 2 | 26 | 115,000-117,000 |
| Formulation 2 | 1 | 24.5 | 365,000-381,000 |
| | 2 | 24.6 | 189,000-195,000 |
| Post-bake Viscosities | | | |
| Formulation 1 | 1 | 25 | 164,000 |
| | 2 | 25.2 | 95,000-113,000 |
| | 2.5 | 25.3 | 16,000-96,000 |
| Formulation 2 | 1 | 31.4 | Off scale - sample set up (crystallized) |
| | 2.5 | 31.3 | Off scale - sample set up (crystallized) |
| | 4 | 31.3 | Off scale - sample set up (crystallized) |

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined.

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

The claims directed to the method of the present invention should not be limited to the performance of their steps in the order written except where expressly stated, and one skilled in the art can readily appreciate that the steps may be varied and still remain within the spirit and scope of the present invention.

We claim:

1. A lipid-based food filling, comprising:
   (a) a lipid system, and
   (b) particulates having a size of about 30 micrometers or less, wherein the particulates have a lipophilic surface and are selected from the group consisting of calcium carbonate, magnesium carbonate, magnesium hydroxide, magnesium trisilicate, aluminum silicate, monocalcium phosphate, dicalcium phosphate, tricalcium phosphate, titanium dioxide, aluminum oxide, alumina trihydrate, and combinations thereof,
   wherein the particulates are present in an amount of about 10 wt % to about 25 wt % of the filling,
   wherein the filling has a water activity of less than about 0.3 and wherein substantially no fat separates from the filling when the filling is heated to temperatures of up to about 200° F.

2. The filling of claim 1, wherein the lipid system is present in an amount of about 25 wt % to about 45 wt % of the filling.

3. The filling of claim 1, wherein the lipid system is present in an amount of about 33 wt % of the filling.

4. The filling of claim 1, wherein the particulates comprise calcium carbonate particles.

5. The filling of claim 1, wherein the particulates are present in an amount of about 17 wt % of the filling.

6. The filling of claim 1, wherein the particulates have a hydrophobic degree of about 5 g to about 35 g.

7. The filling of claim 1, further comprising an emulsifier present in an amount of less than about 5 wt % of the filling.

8. The filling of claim 7, wherein the emulsifier comprises lecithin.

9. The filling of claim 1, further comprising sweetener.

10. The filling of claim 9, wherein the sweetener comprises particles sized to pass through a U.S. Sieve #200.

11. The filling of claim 9, wherein the sweetener comprises 6X sugar.

12. The filling of claim 9, wherein the sweetener comprises 10X sugar.

13. The filling of claim 9, wherein the sweetener is present in an amount of about 40 wt % to about 60 wt % of the filler.

14. The filling of claim 9, wherein the sweetener is present in an amount of about 50 wt % of the filler.

15. The filling of claim 1, wherein the filling has an initial viscosity before heating, and a final viscosity after being subjected to a temperature of about 400° F. for about 5 to about 30 minutes, wherein the final viscosity is greater than the initial viscosity.

16. The filling of claim 15, wherein the initial viscosity is about 100,000 cps to about 200,000 cps.

17. The filling of claim 15, wherein the final viscosity is about 70,000 cps to about 170,000 cps.

18. The filling of claim 1, wherein lipids of the lipid system are absorbed on a surface of the particulates.

19. The filling of claim 1, wherein the lipid system comprises a high-melting lipid having a melting point of about 110° F. or higher and a low-melting lipid having a melting point of about 105° F. or lower.

20. The filling of claim 19, wherein the high-melting lipid comprises shortening.

21. The filling of claim 19, wherein the low-melting lipid comprises soybean oil.

22. The filling of claim 19, wherein the lipid system comprises about 10 wt % to about 40 wt % high-melting lipid.

23. The filling of claim 19, wherein the lipid system comprises about 75 wt % low-melting lipid and about 25 wt % high-melting lipid.

24. A method of preparing a filling, comprising,
(a) blending a lipid system with particulates until the particulates are at least substantially fully dispersed within the lipid system, to form a first blended mixture, wherein the particulates have a size of about 30 micrometers or less and a lipophilic surface, and wherein the particulates are selected from the group consisting of calcium carbonate, magnesium carbonate, magnesium hydroxide, magnesium trisilicate, aluminum silicate, monocalcium phosphate, dicalcium phosphate, tricalcium phosphate, titanium dioxide, aluminum oxide, alumina trihydrate, and combinations thereof; and
(b) blending the first blended mixture with sweetener to form a filling,
wherein the particulates are present in an amount of about 10 wt % to about 25 wt % of the filling,
wherein the filling has a water activity of about 0.3 or less and wherein substantially no fat separates from the filling when the filling is heated to temperatures of up to about 200° F.

25. The method of claim 24, further comprising blending the first blended mixture with an emulsifier.

26. The method of claim 24, wherein blending the lipid system with the particulates to form a first blended mixture comprises blending the lipid system with the particulates for no more than 7 minutes at about 60 rpm.

27. The method of claim 24, further comprising heating the filling to a temperature of up to about 200° F.

28. The method of claim 24, wherein the filling has an initial viscosity before heating, and a final viscosity after the filling is subjected to heat, wherein the final viscosity is greater than the initial viscosity.

29. The method of claim 28, wherein the initial viscosity is 100,000 cps to about 200,000 cps.

30. The method of claim 28, wherein the final viscosity is 70,000 cps to about 170,000 cps.

31. The method of claim 24, wherein the filling includes the lipid system in an amount of about 25 wt % to about 45 wt % of the filling.

32. The method of claim 24, wherein the filling includes the lipid system in an amount of about 33 wt % of the filling.

33. The method of claim 24, wherein the particulates comprise calcium carbonate particles.

34. The method of claim 24, wherein the filling includes the particulates in an amount of about 17 wt % of the filling.

35. The method of claim 25, wherein the filling includes the emulsifier in an amount of less than about 5 wt % of the filling.

36. The method of claim 25, wherein the emulsifier comprises lecithin.

37. The method of claim 24, wherein the sweetener comprises particles sized to pass through a U.S. Sieve #200.

38. The method of claim 24, wherein the sweetener comprises 6X sugar.

39. The method of claim 24, wherein the sweetener comprises 10X sugar.

40. The method of claim 24, wherein the filling includes the sweetener in an amount of about 40 wt % to about 60 wt % of the filler.

41. The method of claim 24, wherein the filling includes the sweetener in an amount of about 50 wt % of the filler.

42. The method of claim 24, wherein lipids of the lipid system are absorbed on a surface of the particulates.

43. The method of claim 24, wherein the particulates have a hydrophobic surface.

44. The method of claim 24, wherein the lipid system comprises a high-melting lipid having a melting point of about 110° F. or higher and a low-melting lipid having a melting point of about 105° F. or lower.

45. The method of claim 44 wherein the low-melting lipid comprises soybean oil.

46. The method of claim 44, wherein the high-melting lipid comprises shortening.

47. The method of claim 44, wherein the lipid system comprises about 60 wt % to about 90 wt % low-melting lipid.

48. The method of claim 44, wherein the lipid system comprises about 10 wt % to about 40 wt % high-melting lipid.

49. The method of claim 44, wherein the lipid system comprises about 75 wt % low-melting lipid and about 25 wt % high-melting lipid.

* * * * *